United States Patent Office 2,905,198
Patented Sept. 22, 1959

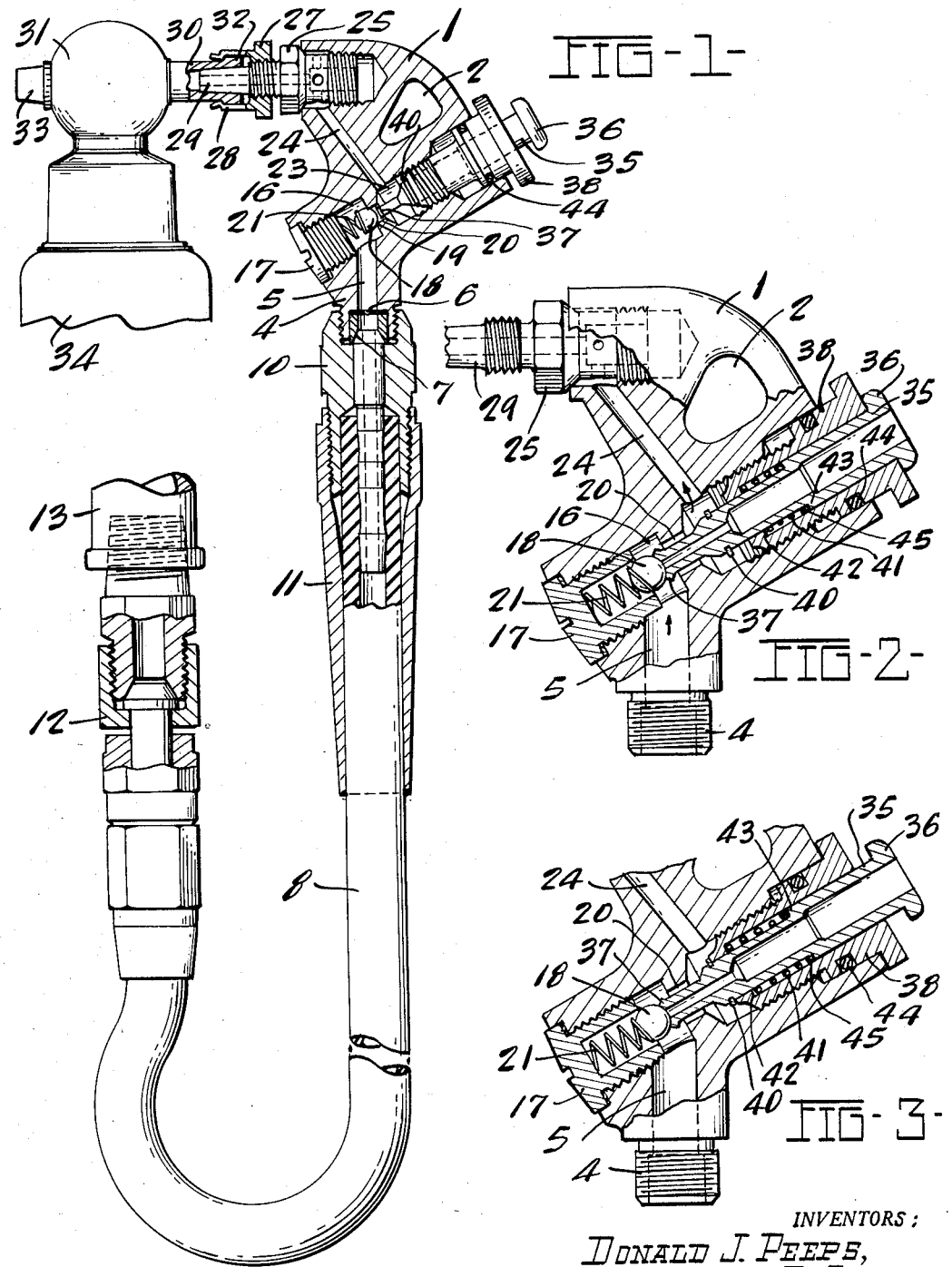

2,905,198

AIR FLOW CONTROL VALVE

Donald J. Peeps, Toledo, Ohio, and Joy B. Schmitt, Somerset, Pa., assignors to The De Vilbiss Company, Toledo, Ohio, a corporation of Ohio Application July 19, 1955, Serial No. 522,965

4 Claims. (Cl. 137—627.5)

This invention relates generally to an air flow control valve assembly and particularly to one adapted for use with atomizers in the application by doctors and dentists of medicinal solutions.

For such professional purposes accurate and reliable operation is very important as critical medicaments are often involved. Ease of handling is also important in the efficient treatment of numerous patients.

The general object of this invention is the provision of an air valve having the desirable qualities mentioned.

More specifically an object of this invention is the provision of an air valve which is capable of being readily adjusted to furnish a flow of air under various pressures and volume.

A further object is the provision of an air valve which is convenient to hold and easy to operate.

Another object is to provide a valve which may be quickly and securely fastened to an atomizer or the like and in a manner whereby the atomizer is supported upon the valve.

A still further object is a valve that in conjunction with the connection on an air supplying hose may serve as a handle for the valve and the attached atomizer.

Another object is a valve that may be set in open position.

A further object is a valve which upon release vents air beyond it back through the valve to the atmosphere.

These and other objects and advantages are believed attained with the valve forming the subject of the following description and as illustrated in the accompanying drawings, in which:

Figure 1 is a vertical section of a valve assembly embodying the invention shown attached to an air supplying hose and to an atomizing device;

Figure 2 is an enlarged vertical section of the valve of Figure 1 with the valve plunger depressed to operative position; and Figure 3 is a partial vertical section of the same valve with parts in locked open position.

Referring to the drawings in more detail the valve assembly has a body 1 which has a cross opening 2 for placing over a hanging hook when the unit is not being used.

On the lower end of the assembly is an inlet nipple 4 with the interior passage 5. At the entrance of this passage is a screen 6 held in place by the compressible sealing bushing 7.

A flexible hose 8 is fastened to the nipple 4 by a threaded connection 10. The latter is held in place on the hose by a compression sleeve 11, elongated to serve as a handle. The other end of the hose is attached by a connection assembly 12 to a pipe fitting 13 representing the air supply source.

The compressed air traveling through the inlet passage 5 enters the valve chamber 16. This chamber is closed by a plug 17 which also serves as a guide for the valve ball 18 when it is retracted from its seat 19 in the opening 20. A spring 21 lodged within the plug 17 bears on the ball 18 to incline it to its seat.

The opening 20 leads to a secondary chamber 23 from which an outlet passage 24 communicates with the outlet nipple 25.

Upon the outlet nipple 25 is threadedly mounted a coupling 27 with spring prongs 28. The outlet nipple is exteriorly tapered at 29 to fit within a complementary interior taper in the inlet stem 30 of the atomizer 31. The prongs 28 hook over an annular flange 32 on the inlet stem. The atomizer discharge nozzle is indicated at 33. The nozzle is commonly several inches in length for insertion in nasal and oral cavities. A portion of the atomizer medicament container is represented at 34.

The flow of air through the valve assembly is controlled by the positioning of the tubular plunger 35. When non-operative the plunger is in an outwardly extended position as shown in Figure 1 permitting the valve ball 18 to remain on its seat 19 shutting off the air flow. When pressed in by the thumb of the person applying the spray the tip 37 of the plunger engages the ball and pushes it away from its seat as illustrated in Figure 2.

The plunger 35 reciprocates within the hollow adjusting screw 38, which is loosely threaded within the valve body. The C-shaped washer 40 set in a groove on the plunger abuts the inner end of the screw 38 to limit outward movement of the plunger. A spring 41 between a shoulder 42 on the screw and a shoulder 43 on the plunger normally holds the plunger in the most outward position permitted by the retaining washer 40. An O-ring 44 provides a seal between the screw 38 and the valve body while packing 45 seals between the plunger and the screw.

The laterally extending periphery of the button 36 limits the inner movement of the plunger by meeting the outer end of the adjusting screw 38. Accordingly by threading the screw inwardly or outwardly, the extent the valve ball may be moved from its seat is respectively increased or decreased. The amount and pressure of the air passing through the valve may be varied by such adjustment of the screw to give whatever size and force of spray discharge is considered best by the doctor prescribing the treatment.

The size and shape of the valve assembly in relation to the adjacent hose connection and attached atomizer enables the operator of the device to place his fingers around the atomizer container in case it is a tall narrow conventional type or otherwise around the forepart of the valve assembly and of the elongated connection. The palm of his hand is held against the rear side of the valve assembly and hose connection leaving his thumb free to depress the plunger. The valve body and the operator's hand project a minimum degree above the axis of the nozzle of the atomizer in order that the physician using the instrument may clearly observe the area being treated along a line slightly above the nozzle axis.

After applying the atomizer medicament and the plunger is forced by the spring away from the ball valve the air flow is cut off by the ball. At the same time any compressed air remaining in the atomizer head, and in the case of a pressure atomizer within the atomizer container above the liquid medicament, is rapidly vented back into the secondary chamber and to the atmosphere through the center of the tubular plunger.

On occasion it may be desirable to maintain the atomizer in continuous operation for intervals of a minute or more. In such circumstances the need of holding the plunger depressed by the thumb may be avoided by screwing in the adjusting screw to the full allowable extent of such movement. This carries the plunger inwardly to a point where it holds the ball valve off of its seat. The various parts of the valve are then in the position shown in Figure 3. This set opening of the ball valve may be selected to conform with the type of spray desired.

The concave contour of the plunger tip 37 is complementary to the spherical shape of the ball valve 18 and therefore not only acts to keep the valve 18 in line with its seat but also serves to shut off the interior end of the atmospheric venting passage when the tip is in engagement with the ball valve.

It may be seen from the preceding that the valve assembly provided by this invention is versatile, compact and easily used.

Various modifications may be made within the spirit of the invention and the scope of the appended claims.

We claim:

1. An air valve assembly, for manual support and operation, including a body, a valve chamber extending within the body at an oblique angle, a vertically disposed inlet passage and a horizontally directed outlet passage both communicating with the chamber, a movable valve and a valve seat in the chamber, a spring bearing on the valve to hold it to its seat, a manually depressible plunger projecting exteriorly of the body, upwardly and rearwardly therefrom, and aligned to thrust the valve from its seat in opposition to the spring, an atmospheric venting bore running axially of the plunger, an inner tip on the plunger having a surface contacting the valve and complementary in contour to the contacted surface of the valve, the interior end of the axial bore lying within the boundary of the valve contacting surface of the tip, a thumb button on the exterior end of the plunger through which the axial bore reaches the atmosphere, whereby the thumb of the operator when applied to the thumb button closes the exterior end of the bore, and the valve surface contacted by the plunger tip closes the interior end of the bore, and an axially adjustable tubular member through which the plunger extends, the thumb button on the exterior end of the plunger having a peripheral flange which abuts the tubular member and thus coacts therewith to limit the inward movement of the plunger.

2. An air valve assembly according to claim 1 in which the valve is ball-shaped and the inner tip of the plunger is concave to complementarily fit against the ball-shaped valve.

3. An air valve assembly according to claim 1 in which the body is shaped for easy grasping by the hand and the oblique projection of the plunger from the valve chamber facilitates application of the thumb to the thumb button of the plunger.

4. An air valve assembly according to claim 1 in which there are opposed shoulders on the adjoining surfaces of the tubular member and the plunger, and a spring is compressed between the shoulders to incline the plunger outwardly.

References Cited in the file of this patent

UNITED STATES PATENTS

| | | |
|---|---|---|
| 559,881 | Ahrens et al. | May 12, 1896 |
| 1,163,471 | Schramm | Dec. 7, 1915 |
| 1,279,087 | Desmond | Sept. 17, 1918 |
| 1,541,794 | Costa | June 16, 1925 |
| 1,599,998 | Heck | Sept. 14, 1926 |
| 1,890,494 | Borden | Dec. 13, 1932 |
| 2,564,286 | Stephany | Aug. 14, 1951 |
| 2,659,385 | Hayden | Nov. 17, 1953 |
| 2,793,653 | Payne | May 28, 1957 |

FOREIGN PATENTS

| | | |
|---|---|---|
| 362,573 | Italy | of 1938 |